Figure 2A:
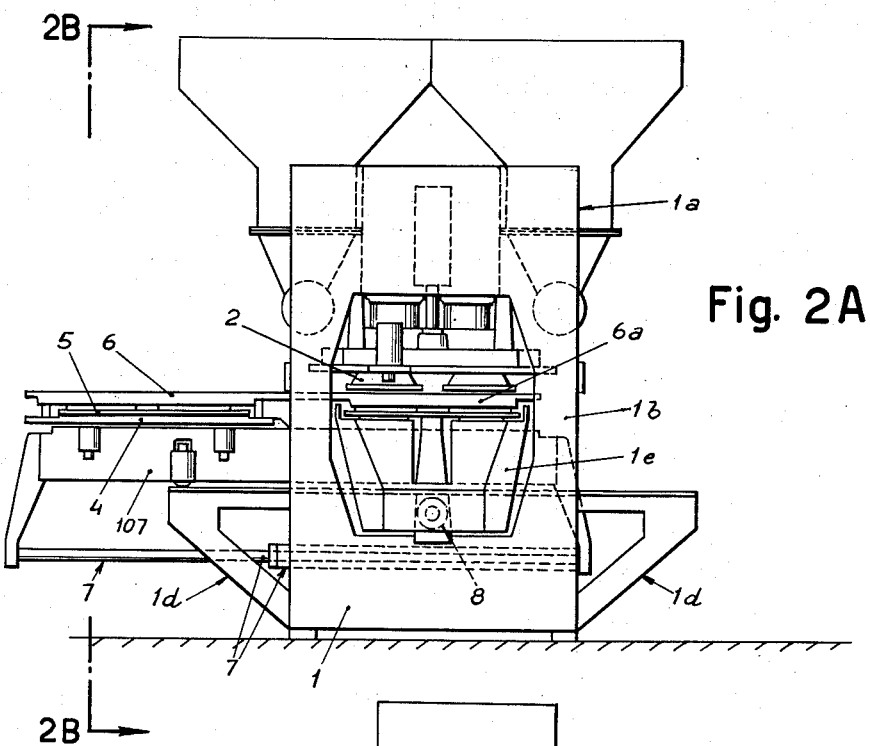

April 23, 1963    E. LONGINOTTI    3,086,271
MACHINE FOR MOULDING TILES, SLABS AND
THE LIKE OR OTHER OBJECTS
Filed March 30, 1960    10 Sheets-Sheet 1
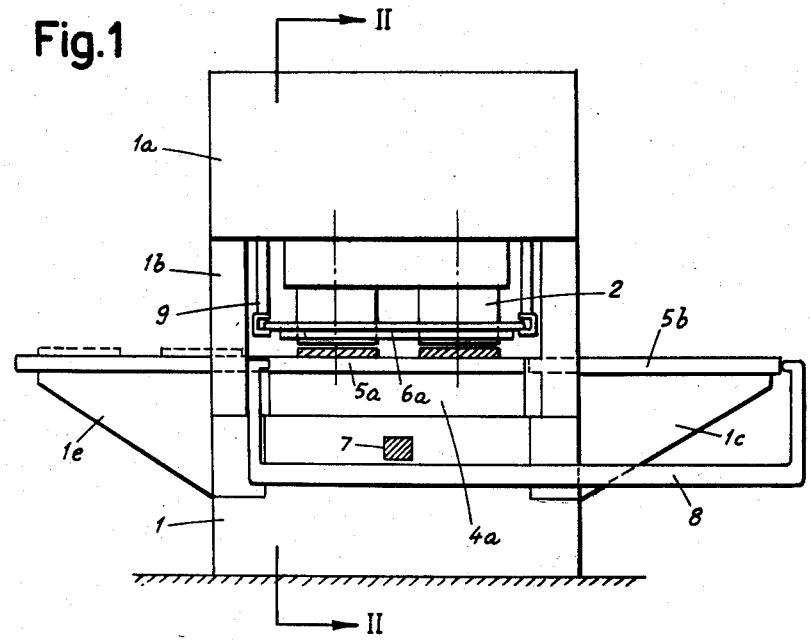
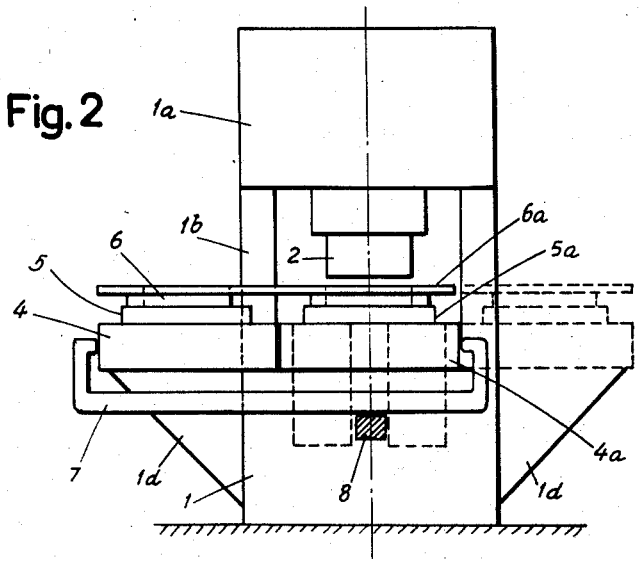
INVENTOR:
ENRICO LONGINOTTI INVENTOR:
ENRICO LONGINOTTI
by
E.M. Squire
ATTY.

April 23, 1963  E. LONGINOTTI  3,086,271
MACHINE FOR MOULDING TILES, SLABS AND
THE LIKE OR OTHER OBJECTS
Filed March 30, 1960  10 Sheets-Sheet 3

INVENTOR:
ENRICO LONGINOTTI
by
E. M. Squire
Atty.

INVENTOR:
ENRICO LONGINOTTI
By
E. M. Squire
ATTY

April 23, 1963 E. LONGINOTTI 3,086,271
MACHINE FOR MOULDING TILES, SLABS AND
THE LIKE OR OTHER OBJECTS
Filed March 30, 1960 10 Sheets-Sheet 5

INVENTOR:
ENRICO LONGINOTTI
By
E. M. Squire
ATTY.

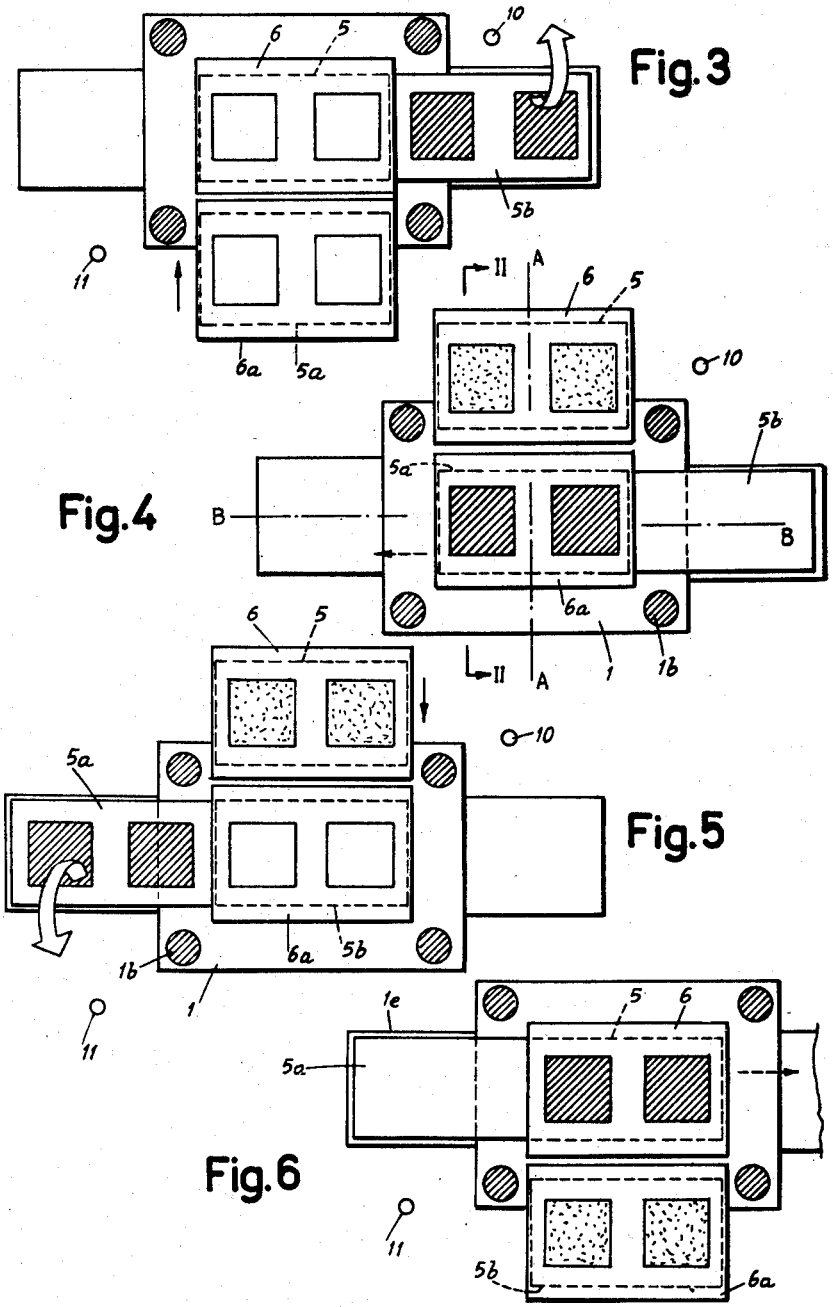

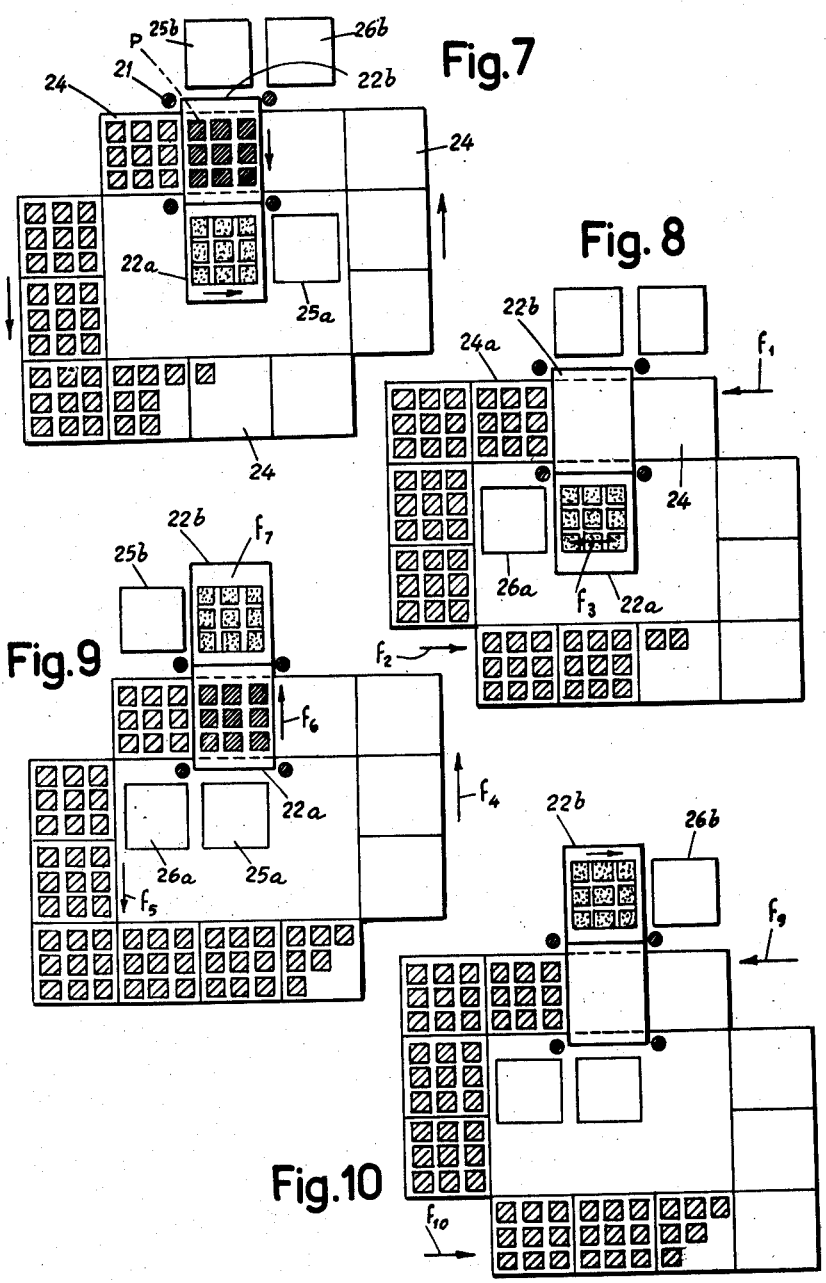

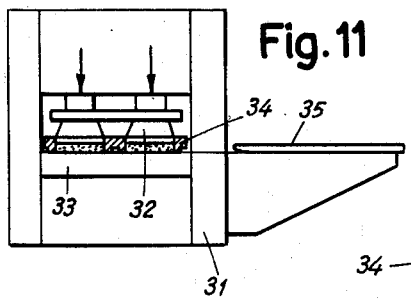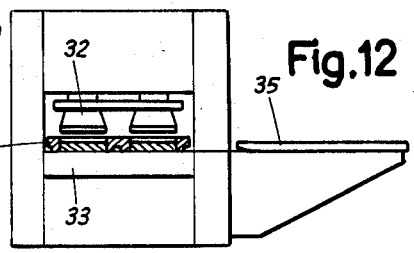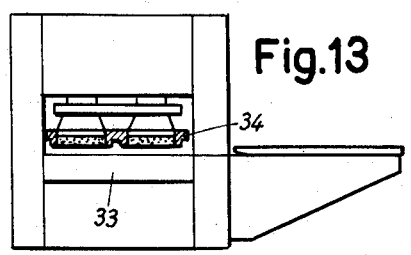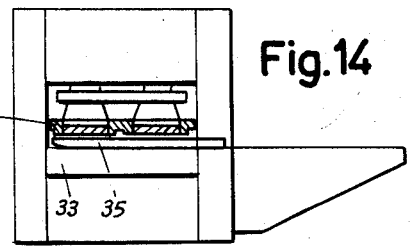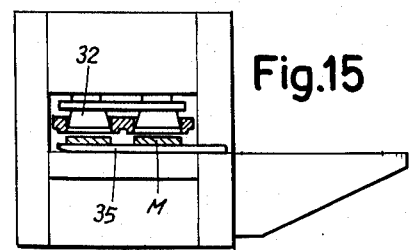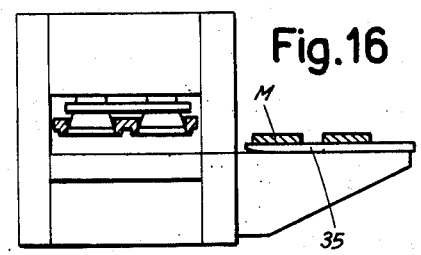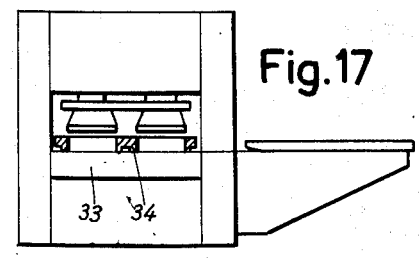

April 23, 1963

E. LONGINOTTI 3,086,271

MACHINE FOR MOULDING TILES, SLABS AND THE LIKE OR OTHER OBJECTS

Filed March 30, 1960

10 Sheets-Sheet 9

INVENTOR:
ENRICO LONGINOTTI
By
Richardson, David and Newton
Attys.

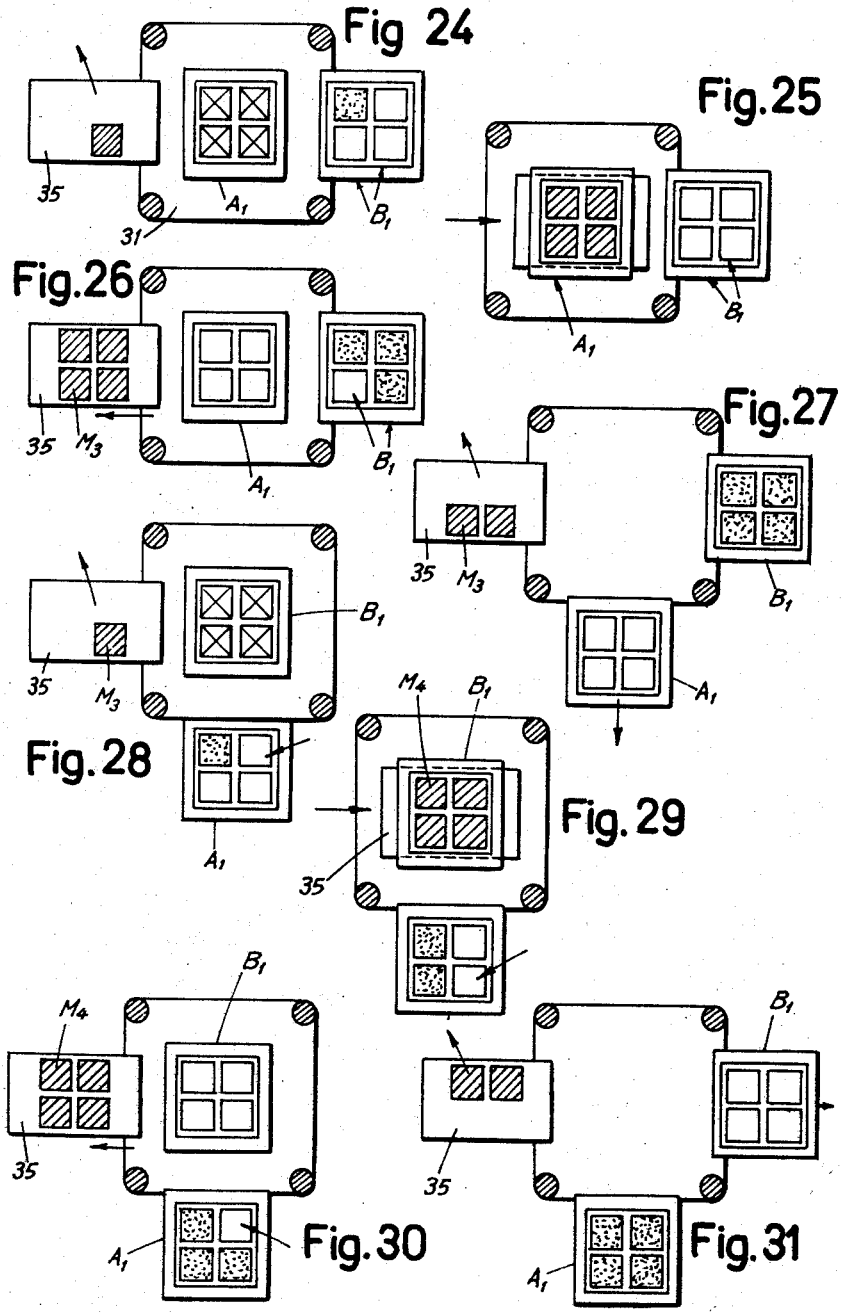

United States Patent Office 3,086,271
Patented Apr. 23, 1963

3,086,271
MACHINE FOR MOULDING TILES, SLABS AND THE LIKE OR OTHER OBJECTS
Enrico Longinotti, Via Donato Giannotti 75, Florence, Italy
Filed Mar. 30, 1960, Ser. No. 18,613
Claims priority, application Italy Apr. 7, 1959
3 Claims. (Cl. 25—60)

The invention relates to a machine for moulding tiles, slabs and the like or other objects. The machine operates preferably automatically to move several multiple dies in a cycle which permit loading and unloading of the machine even during the moulding operation.

A moulding machine according to the invention comprises a machine for moulding articles such as tiles or slabs having dies comprising a number of die parts and means for conveying the moulding articles, said die parts and conveying means being movable along mutually perpendicular paths extending respectively between a pressing position and a loading position and between said pressing position and a pick-up or removal position for the moulded articles.

In one embodiment, the moulding machine includes dies each formed by a frame, a movable bottom member and a separate plate with which a pressing pad cooperates the bottom members on to which the moulded articles are subsequently expelled being movable in one direction with the frames, the frames being movable in a transverse direction with respect to the direction of movement of the bottom members, the arrangement being such that alternately one of the dies is moved into the pressing or moulding position and the other into a loading position.

In one embodiment at least three slidable bottom members are provided, two of which are cyclically located under the dies, while the third or others are always moved laterally with respect to the dies in the direction of movement of the bottom members to allow the moulded articles to be picked up.

According to another embodiment, the machine comprises a moulding or pressing structure which defines a moulding or pressing position, and a pair of dies each formed by a bottom member and by a frame which are capable of being separated only in the vertical direction, each of said dies being movable from an outer position to the moulding or pressing position and vice-versa, the movement of the two dies being synchronised in such a way that, while a die is in the pressing position, the other die is in the loading position. A pick-up table is movable into the pressing position after the frame has been raised to receive the moulded articles expelled from the frame by relative movement between the frame and a pressing pad.

According to a modification of this embodiment, the two dies are alternately moved in opposite directions along an axis so that with a simultaneous movement one die is transferred from a first loading position lateral of the pressing position and the other die is transferred from the pressing position to a second lateral loading position opposite to the first. The movement of the pick-up table is in a direction normal to the direction of movement of the dies.

According to another modification of this embodiment, two independent dies are movable in two mutually perpendicular directions, the movement being so synchronised that after one of the dies has been moved from the pressing position to a lateral loading position, the other die is moved from a lateral loading position, angularly spaced by 90° with respect to the former into the pressing position. The pick-up table in this case is moved along one of the two directions of movement of the dies, from the opposite side of the path of movement of said die.

Figure 2B:
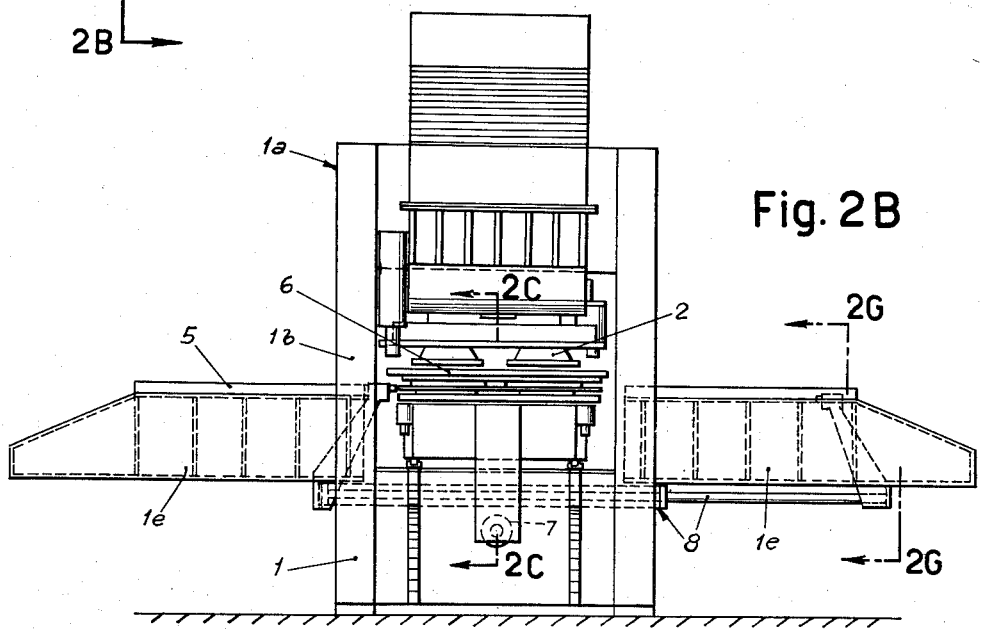
Figure 2C:
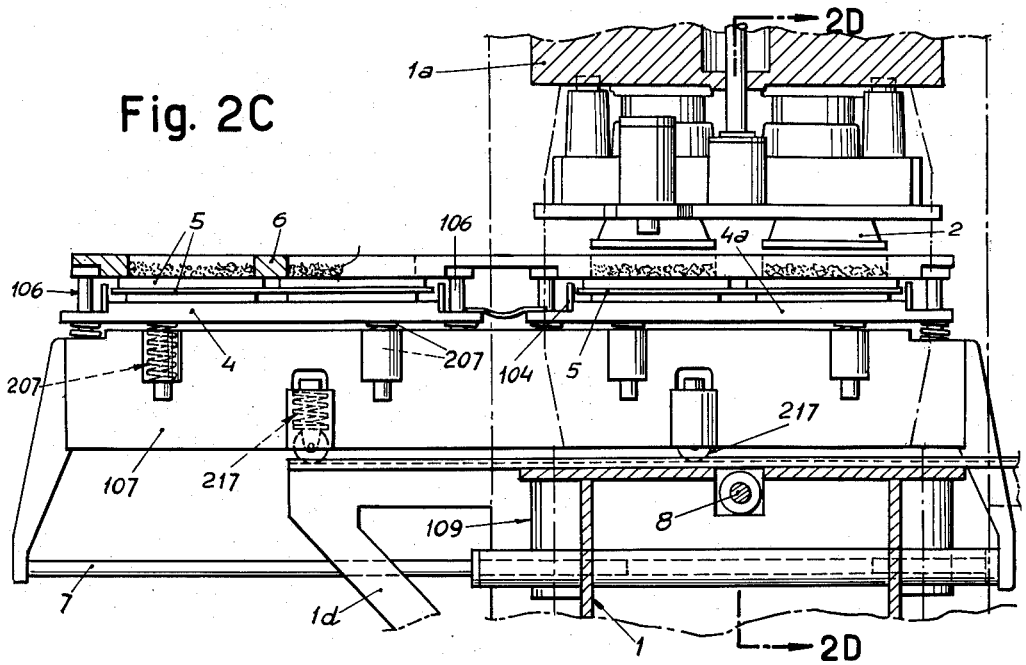
Figure 2C:
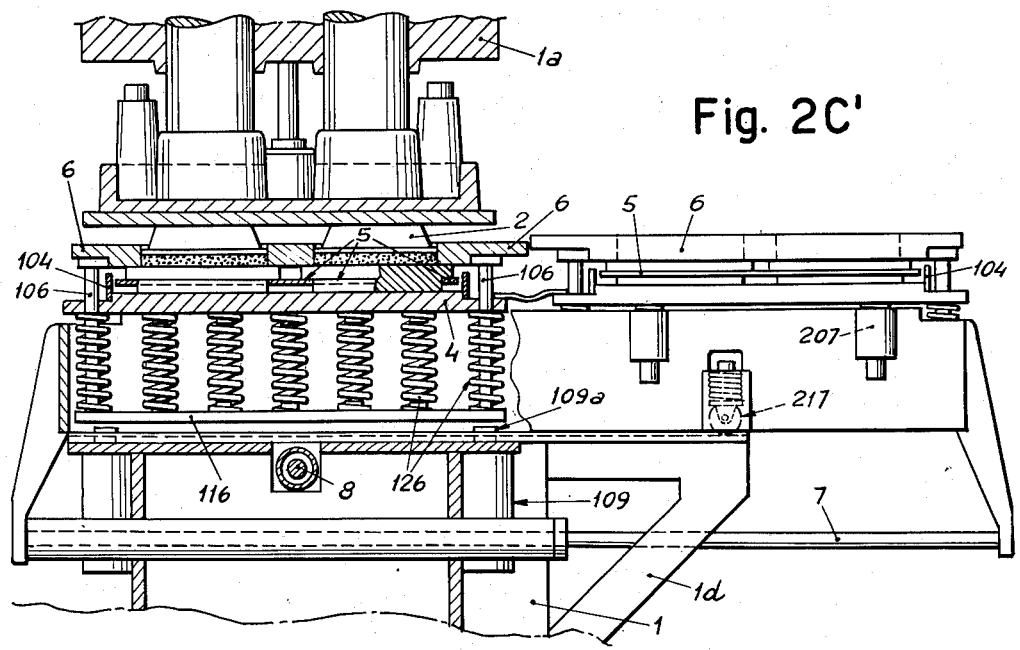
Figure 2D:
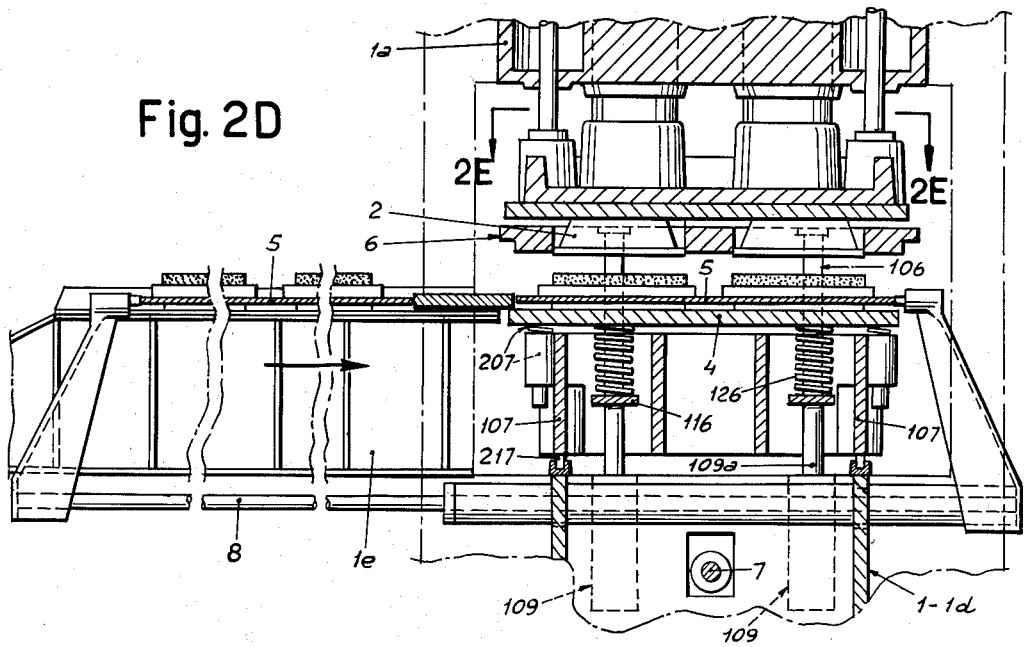
Figure 2D:
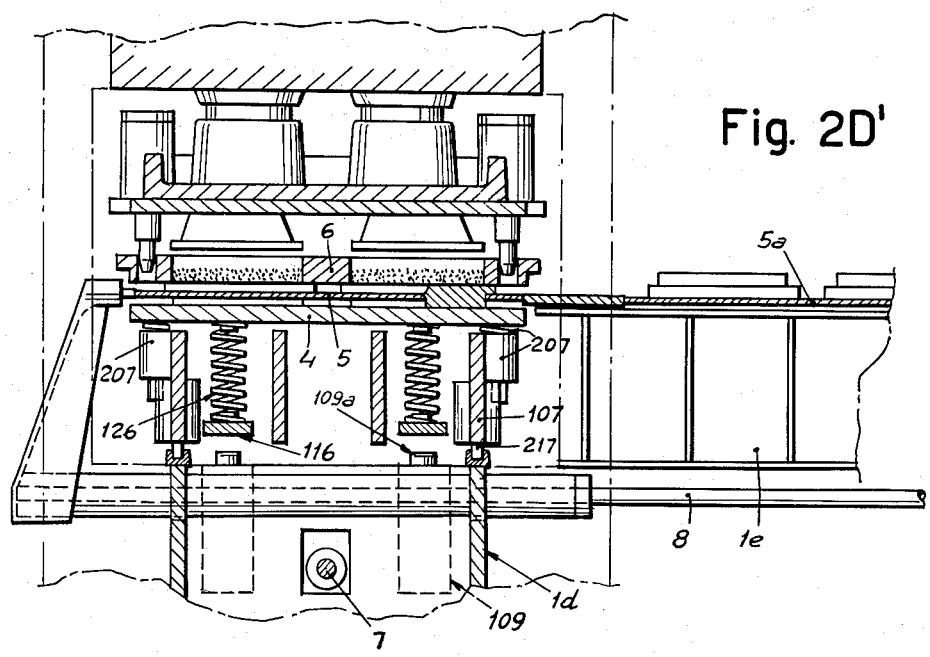
Figure 2E:
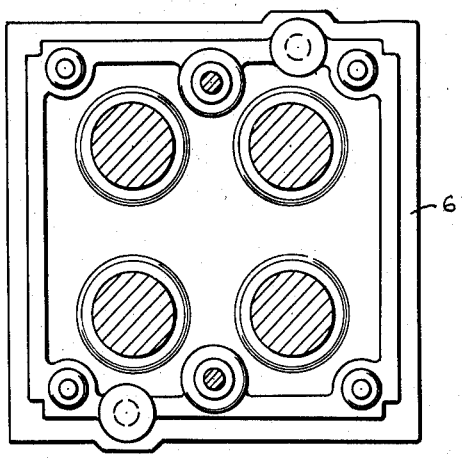
Figure 2F:
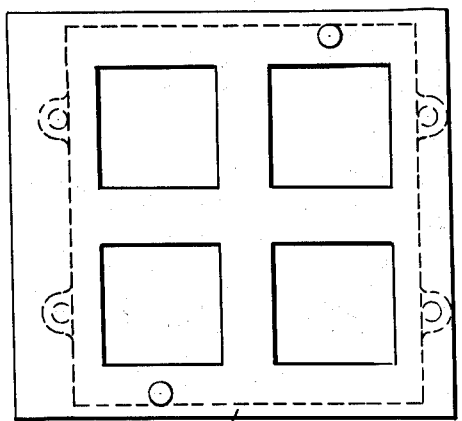
Figure 2G:
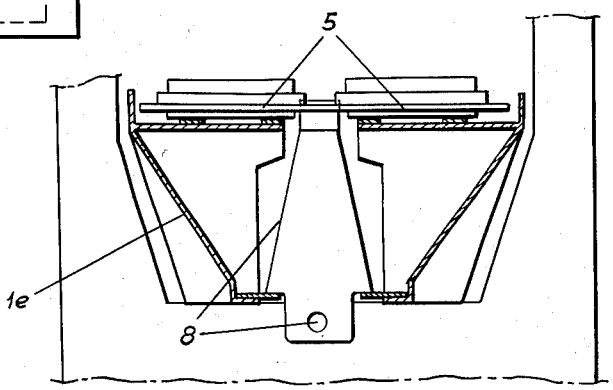

The accompanying drawings diagrammatically illustrate some embodiments of the invention. In the drawings:

FIGURE 1 shows diagrammatically a side view of the press of a moulding machine;
FIGURE 2 shows a diagrammatically sectional view taken along the line II—II of FIGURE 1 and FIGURE 4;
FIGURE 2A is a view similar to FIG. 2 but somewhat more detailed;
FIGURE 2B is a sectional view taken along line 2B—2B of FIG. 2A;
FIGURE 2C is an enlarged sectional view taken along line 2C—2C of FIG. 2B and showing a slidable structure in one position;
FIGURE 2C' is a view similar to FIG. 2C showing the slidable structure in another position, parts of the machine being broken away;
FIGURE 2D is a sectional view taken on line 2D—2D of FIG. 2C showing the machine in one pressing position;
FIGURE 2D' is a sectional view similar to FIG. 2D showing the machine in another pressing position;
FIGURE 2E is a horizontal sectional view taken along line 2E—2E of FIG. 2D;
FIGURE 2F is a plan view of a frame;
FIGURE 2G is a sectional view on an enlarged scale taken along line 2G—2G of FIG. 2B;
FIGURES 3, 4 and 5, 6 show, by way of horizontal sectional views of the machine, the arrangement of the several members of the moulding machine in four subsequent stages, which illustrate the operation of the machine;
FIGURES 7, 8, 9 and 10 illustrate by means of horizontal sectional views, the operation of a moulding machine in which die bottom members move along an annular track;
FIGURES 11 to 17 show, by way of vertical sectional views, the operation of another embodiment of moulding machine;
FIGURES 18 to 23 diagrammatically illustrate by way of plan views the stages of movement of the die assemblies in an embodiment wherein the dies are connected together for movement along a single direction;
FIGURES 24 to 31 illustrate in plan view the eight operational stages of an embodiment wherein two dies are moved in mutually perpendicular directions.

According to FIGURES 1 to 6, 1 and 1a denote the base frame of a double die hydraulic press of which the upper section 1a is supported by columns 1b and wherein 2 denotes die pads. The structure 1, 1b, 1a is provided with sliding means (not shown), which allow the die structure to slide along the axis A—A of FIGURE 4. One die structure comprises a base 4, a bottom member 5 and a frame 6, and the other comprises a base 4a, a bottom member 5a and a frame 6a. The frames 6, 6a are movable in the direction of the axis A—A while each bottom member 5 and 5a as well as another bottom member 5b, is capable of being moved in the direction of the axis B—B of FIGURE 4. The bottom members 5, 5a and so on may themselves include a base to replace the bases 4, 4a, in which case the bases so included will also move in the direction B—B.

The movement of the assembly of frame, bottom member and base in the direction A—A of FIGURE 4 is controlled by a device 7 which may be, for example, hydraulically or mechanically operated, and which is shown in FIGURE 2. The bottom members such as 5, 5a and 5b are on the other hand moved along the axis B—B of FIGURE 4 by a device 8 in FIGURE 1.

Suitable coupling means, in addition to sealing means, are provided between the bases 4 and the frames, with the interposition of the bottom members, while suitable means are provided for centering the frames in relation to the pads 2. Means 9 are also provided (see FIGURE 1) to effect the partial lifting of the frames in the pressing or moulding position after pressing has taken place, so as to expel the tiles on to the bottom members.

Suitable means are provided in the structure to form guides for the sliding of the frames, or of the frames formed with the bases, and to guide the bottom member, such means being the lateral brackets 1d on which the bases with the frames may slide and the brackets 1e on which the bottom members may stick.

Numeral 107 in FIG. 2A indicates the structure slidable on the guides formed by the brackets 1d. The slidable structure 107 (controlled by the piston system 7) bears the assemblies of the base 4 and frame 6 of which assemblies one is located in the pressing position and the other one in one of the two external loading positions. Bottom member 5 is inserted between the base 4 and the frame 6 of each assembly.

The frame 6 carries columns 106 extending downwardly through holes of the respective bases 4 (see FIGS. 2C and 2C'). The columns 106 under the bases 4 are connected two-by-two by cross-beams 116 which serve to contract the spring 126. The contracted springs react against the bases 4 in such a manner as to raise one frame 6 and base 4 against the other. In this way, the frame 6 is matched to the bottom member 5 interposed therebetween and the base 4. A frame could also be pressed against a bottom member 5 by upper pressing members or merely by its own weight.

The operational stages of the moulding machine are shown in FIGURES 3 to 6. In the arrangement of FIGURE 3, the frame 6a with the bottom member 5a and the base 4a (not shown) are located in the loading position, while the frame 6 with the bottom member 5 is located in the inactive pressing position. The bottom member 5b is laterally located in the pick-up or unloading position, the associated slabs or tiles having been pressed in the pressing position and moved therefrom into this pick-up position. The small arrow in FIGURE 3 indicates the subsequent movement to attain the arrangement of FIGURE 4, wherein the two dies have been moved, so that the elements 5a and 6a are located in the pressing position, the elements 5 and 6 are located in another loading position and the bottom member 5b has been unloaded of the previously moulded material. The arrow of FIGURE 4 indicates the movement which is effected to attain the arrangement of FIGURE 5. In the arrangement of FIGURE 5 the two bottom members 5b and 5a, after the pressing or moulding in the die formed by the parts 5a and 6a and after the lifting of the frame 6a, are moved in such a way that the bottom member 5b is located under the frame 6a in the pressing position, while the bottom member 5a with the moulded tiles is moved in the other pick-up position. The die formed by the parts 5 and 6 is then loaded. The small arrow of FIGURE 5 indicates the movement to attain the arrangement of FIGURE 6. In the arrangement of FIGURE 6 the die formed by the parts 5 and 6 loaded in the position of FIGURE 5 has been moved into the pressing position and the pressing or moulding takes place therein after which the moulded articles are expelled from the frames, while the die formed by the parts 5b and 6a has been moved into the loading position. The arrow of FIGURE 6 indicates the movement of the parts to attain the next arrangement, which is that already illustrated in FIGURE 3 except that the bottom members have been interchanged. In fact, in the arrangement following that of FIGURE 6 which is similar to that in FIGURE 3, the bottom member 5 is moved into the position previously occupied by the bottom member 5b in FIGURE 3, while the bottom member 5a reaches the position previously occupied by the bottom member 5 in FIGURE 3 and is thus located under the frame 6. The loading, as described for the dies 5a, 6a in the arrangement of FIGURE 3, is completed in the die formed by the parts 5b and 6a. 10 and 11 denote the operational stations of two operators who are in charge of the machine, and each operator is responsible for the pick-up and loading operations of his own section. In particular, the operator 10 is responsible for the pick-up operation of FIGURE 3 and in the arrangement of FIGURES 4 and 5 for the loading of the die, while the operator 11 is responsible in the arrangement of FIGURE 5 for the pick-up operation and in the arrangement of FIGURES 6 and 3 for the die loading. The operations effected by the operators 10 and 11 may however be effected completely or partly by automatic loading and pick-up means.

The raising of the frame after pressing is accomplished by the members 9 designed to engage the edges of the frame against the matching stress effected by spring 126. It is also possible to arrange some piston-cylinder systems 109 in the main frame 1 under the cross-beams 116. The stems 109a of the piston cylinder systems 109 act on the cross-beams 116 in the pressing position to raise the frame in a manner completely equivalent to the members 9.

The bases 4 bear, for structural purposes, guide edges 104 which serve to guide the bottom members 5 slidably in the direction of the surface of the drawing, according to FIGS. 2D and 2D', along the guides formed by the the structure 1e.

In order to insulate the machine from vibrations to which the dies are submitted in order to settle the material, dies 4, 5 and 6 are each resiliently suspended on the structure 107 by spring means 207. In order to provide resistance to the pressing stresses, the base 4 which is in the pressing position (and to which a bottom member 5 and the associated frame 6 are matched) during the pressing action effected by the pads, is approached to bear against the structure 107. This structure 107 in turn bears on the stationary structure 1—1d. The structure 107 may be borne by wheels 217. The wheels are resiliently mounted in order to allow structure 107 to rest on structure 1—1d directly instead of through the wheels (which would not support the stress of the pressing action well).

According to the embodiment of FIGURES 7 to 10, there is provided in the structure 21 a pressing position indicated by P. The structure is combined with an alternately movable structure which is formed by two frames 22a and 22b.

Co-operating with these die frames are a number of bottom members 24 mounted on bases. As shown in the FIGURES 7 to 10, these bottom members 24 are introduced into the pressing position in a direction transverse to the reciprocal movement of the frames 22a, 22b. These bottom members 24 are inserted into and withdrawn from the pressing position always in the same direction. The bottom members 24 are guided along annular guide means which as shown in the drawing are formed by four rectilinear guide ways which define a rectangular track, an automatic traverse means for the bottom members, formed for example by a pneumatic or preferably hydraulic cylinder-piston system being provided in each rectilinear portion of said track. This arrangement allows the individual bottom members to travel intermittently along the same angular path in the rectangular track.

Two different loading means, each of which is formed by a pair of loaders 25a, 26a and 25b, 26b respectively, are arranged adjacent the structure 21 and the guide means for the frames 22a and 22b. The double loaders 25, 26 are moved to release from one the mortar and from the other, material for forimng the lower layer of the finished tile, into the dies formed by a bottom member and by the frame 22a or 22b when the bottom member and frame unit is located under said loaders. Each such unit in turn is moved parallel to the direction in which the bottom member 24 reach and leave the pressing position.

The operation is as follows: In the position of FIGURE 7, the die formed by the frame 22b and a bottom member is located in the pressing or moulding position, while the die formed by the frame 22a and a bottom member previously introduced into the pressing position, is moved into position to be loaded by the loader 26a which supplies the mortar. Passing from the stage of FIGURE 7 to the stage of FIGURE 8, a movement occurs in the direction of the arrow $f_1$ such that the bottom members are stepped forward and the bottom member 24a conveys the moulded tiles beyond the pressing position, while a free bottom member reaches the pressing position under the frame 22b which has been lifted from the last moulded tiles. A movement in the direction of the arrow $f_2$ has also occurred of the corresponding bottom members on the opposite side of the rectangular track. In this stage, by a movement in the direction of the arrow $f_3$, the loader 26a (which has unloaded the mortar), is moved from the position overlying the frame 22a.

Passing from the arrangement of FIGURE 8 to the arrangement of FIGURE 9, there is a movement in the direction of the arrows $f_4$ and $f_5$ of the bottom members along the sides of the rectangular track opposite those previously considered. There is also a movement of the two frames 22a, 22b in the direction of the arrow $f_6$ whereby the die of the frame 22a, previously loaded, is located in the pressing or moulding position, and in the arrangement of FIGURE 9 the pressing or moulding of said material is effected. The frame 22b on the other hand, moves under the loader unit 25b, 26b, which is moved in the direction of the arrow $f_7$ and mortar is discharged from the loader 26b. The frame 22b is located under the loader unit 25b, 26b with a bottom member moved into the pressing position in the direction of the arrow $f_1$ of FIGURE 8.

Passing from the arrangement of FIGURE 9 to the arrangement of FIGURE 10, there is again a movement in the direction of the arrow $f_9$ and of the arrow $f_{10}$ of the bottom members arranged on the side containing the pressing or moulding position and on the side opposite thereto. In this stage, there is also a movement of the loader unit 25b, 26b, in such a way that the material of the lower layer is unloaded from the loader 25b onto the frame 22b. Also in this stage, the tiles formed in the stage of FIGURE 9 are moved on to be subsequently picked up. During the movement of the bottom members carrying the moulded tiles along the rectangular track, it is possible for the tiles to be picked up along a large part of the track by a single human operator, and sufficient time is allowed for the operator also to watch over the other operations of the machine.

FIGURES 11 to 17 show a press structure 31 and pads 32, and bottom member 33 and frame 34 of the die, which is located in the moulding position. Also shown is the table 35 of the pick up slide or carriage which is designed to be inserted between the bottom member 33 and the frame 34, after the lifting of the frame. After completion of the pressing (see FIGURE 11), the pads 32 are raised and also the frame 34 is raised (see FIGURES 12 and 13) and the pick-up carriage table 35 is inserted between the bottom member 33 and the frame 34 (see FIGURE 14). When this has taken place, the pads 32 (see FIGURE 15) are moved downwardly or the frames are further raised so as to press the tiles out of the frame and so that they drop on to the table 35 of the pick-up carriage. The pick-up carriage is then moved outwardly in to the pick-up position of the tiles M (see FIGURE 16) while the frame 34 is lowered on to the bottom member 33 of the die. In this way, the die unit 33, 34 (as shown in FIGURE 17) is re-formed and may be moved from the pressing or moulding position into a loading position.

According to the scheme of FIGURES 18 to 23 two assemblies of dies are provided formed by members 33 and 34, which assemblies are indicated by A and B, the other members being indicated in the same way as in FIGURES 11 to 17.

Figure 18:
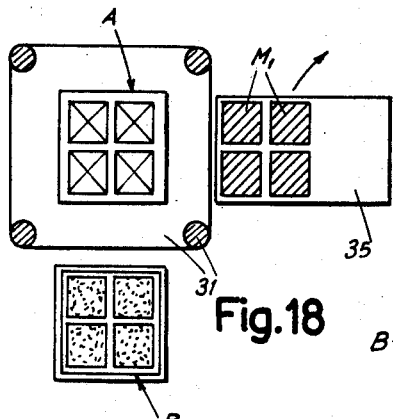
Figure 19:
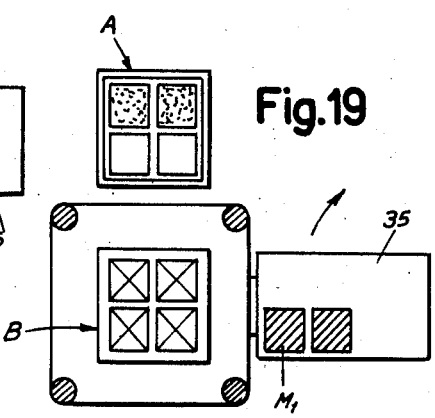
Figure 20:
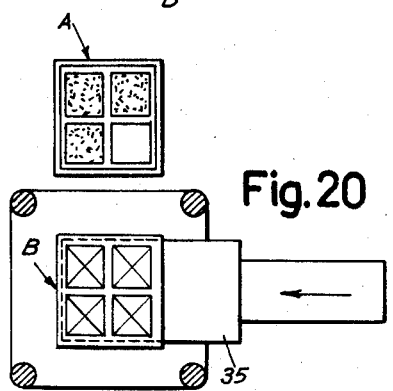
Figure 21:
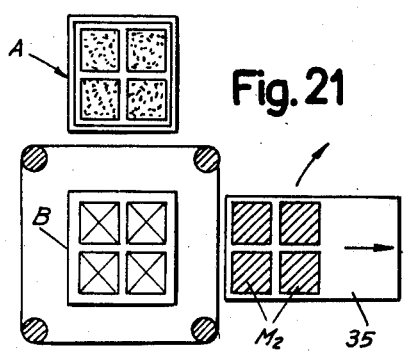
Figure 22:
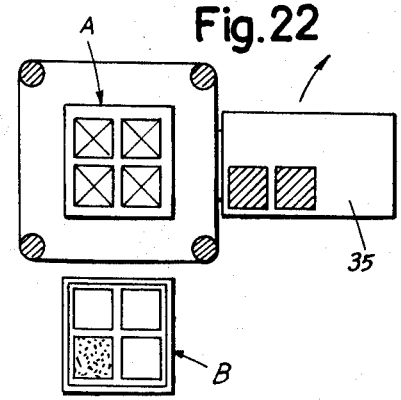
Figure 23:
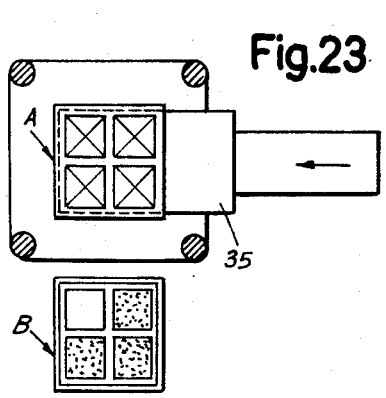

In the position of FIGURE 18, while the die A is in the pressing position, the tiles M which are located in the lateral position of the carriage 35 are picked up. The die B is located in a loading position which is displaced from the pressing position in a direction normal to the direction of movement of the carriage 35. In the stage of FIGURE 19, the loaded die B is moved into the pressing position, while the die A is moved into a loading position which is opposite to that in which the die B was located in the stage of FIGURE 18. Pick-up of the tiles $M_1$ from the carriage 35 continues. In the stage of FIGURE 20, while the die A is loaded, the die B which has undergone pressing, has its frame raised as shown in FIGURE 13, while the carriage 35 from which the tiles $M_1$ formed in the last moulding operation have been removed, is brought back into the pressing position between the bottom member and the frame of the die B. Once the tiles have been pressed out of the frame, the carriage 35 with the tiles is moved out and the tiles are picked up during the stages of FIGURES 21 and 22. The loading is completed in the die A, while the parts 33 and 34 of the die B are coupled again for transfer in the subsequent stage (see FIGURE 22) into the loading position shown in FIGURE 18, and the loaded die A is moved into the pressing position. During the stage of FIGURE 22, tiles continue to be picked up from carriage 35. In FIGURE 23 is shown the stage, wherein, after the pressing in the die A and the lifting of the frame and pads (as in FIGURE 13) the carriage 35 is inserted between the bottom member and the frame of the die A, while loading continues in the die B.

In this embodiment having two opposite loading positions, it is advantageous to provide for automatic loading, as a human operator would otherwise have to move between the two opposite loading positions during the cycle of operations shown in FIGURES 18 to 23. It will be noted that the pick-up operation takes place on only one side of the machine.

With manual loading, a second pick-up carriage opposite to the first one, could be provided and could operate alternatively therewith; two operators can thus each alternately load and pick-up.

To effect loading by hand involving least movement by an operator, an arrangement is shown in FIGURES 24 to 31 according to which two independent dies $A_1$ and $B_1$ are moved in two mutually perpendicular directions, in such a way that the two loading positions, instead of being opposite, are angularly spaced by 90° with respect to the press structure 31. According to this arrangement in the stage illustrated in FIGURE 14, the die $A_1$ is located in the pressing position where the operations of pressing and then lifting of the frame are effected, while the die $B_1$ is located in a right hand lateral loading position. Passing to the stage illustrated in FIGURE 25, the carriage 35 (shown in FIGURE 24) is inserted between the bottom member and the frame of the die $A_1$ to collect the tiles as they are pressed from the frame, the die $B_1$ remaining in the loading position. The die $B_1$ also remains in this position in FIGURE 26, while the carriage 35 comes out of the collection position into the pick-up position. In the stage of FIGURES 27 and 28, first the die A is moved from the pressing position into the lateral loading position (shown below the press) and then the die $B_1$ is moved from its loading position to the pressing position (FIGURE 28). Picking up of the tiles $M_3$ from the carriage 35 continues. In the stage of FIGURE 29, the pressing of the tiles in the die $B_1$ takes place and the frame is raised from the die. The carriage 35 cleared of tiles is inserted to collect the tiles $M_4$ moulded in the die $B_1$. In the stage of FIGURE 30 the tiles $M_4$ have fallen on to the carriage 35 which has been withdrawn to the pick-up position, the die $B_1$ is reformed, while the loading of the die $A_1$ proceeds. In the stage of FIGURE 31, the die $B_1$ is moved again from the pressing position to the loading position which it occupied in the stage of FIGURE 24. Passing from the stage of FIGURE 31 to the stage of FIGURE 24, the loaded die $A_1$ resumes the pressing position which is illustrated in FIGURE 24.

In this case in which the two loading positions of the die $A_1$ and of the die $B_1$ are spaced apart by 90°, a single operator can load both dies, without much movement. The pick-up operation always is effected from the same position. If there is a second pick-up carriage arranged at 90° to the one already described and which operates alternately with that already described, the operator picking up the tiles will have time available during the insertion and withdrawal of the dies and the pressing of the tiles from the frame, for picking up tiles from the other carriage.

The drawings only show a number of embodiments by way of example only and it will be evident to those skilled in the art that these embodiments may be substantially modified without departing from the scope of the invention as defined in the claims appended hereto.

What I claim is:

1. In an automatic moulding machine for tiles, slabs, and the like, in combination: a plurality of pressing pads, two movable frames supported in a plane under the pressing pads, three movable bottom members, horizontal guide means supporting the bottom members under the frames, any two of the bottom members being selectively associated with said frames, a vertical central frame defining a pressing position for said tiles, vertical guide means and first control means for lowering said pads into the vertical central frame at said pressing position, said horizontal guide means comprising first horizontal guides arranged to receive an assembly including the two movable frames and two of said bottom members for horizontally slidably guiding the same, second control means for controlling horizontal sliding movements of said assembly so that while either of said movable frames is located in the pressing position the other of the two movable frames and an associated bottom member is located in one of two loading positions located on opposite sides of said pressing position, said horizontal guide means further comprising second horizontal guides disposed perpendicular to the first horizontal guides and located in a common horizontal plane with said bottom members to receive one of the bottom members for slidably guiding the same towards any one of two spaced pickup positions for moulded tiles, third control means for urging the bottom members along said second horizontal guides under the central frame in the pressing position, means for partly and temporarily raising one movable frame located at the pressing position after pressing of a tile at the pressing position to permit withdrawal of a tile from an underlying bottom member, said third control means being actuated to move the bottom members during the raising of said one movable frame so as to bring a bottom member from a pick-up position to the pressing position and to bring another bottom member from the pressing position to the other pick-up position, said second control means being actuated after raising and subsequent lowering of a movable frame to move a bottom member and associated frame from the pressing position to one loading position and to move another bottom member and another associated frame from the other loading position to the pressing position.

2. In an automatic moulding machine for tiles, slabs and the like, the combination according to claim 1, further comprising coupling means for each movable frame and associated bottom member.

3. In an automatic moulding machine for tiles, slabs and the like, in combination: a plurality of pressing pads, two movable frames each adapted to cooperate with a pressing pad during a pressing movement thereof, three movable bottom members any two thereof being selectively associated with said frames, a vertical central frame defining a pressing position for said tiles, vertical guide means and first control means for lowering said pads into the vertical central frame at said pressing position, first horizontal guides arranged to receive an assembly including the two movable frames and two bottom members for horizontally slidably guiding the same, second control means for controlling horizontal sliding movements of said assembly so that while either of said movable frames is located in the pressing position the other of the two movable frames and an associated bottom member is located in one of two loading positions located on opposite sides of said pressing position, second horizontal guides disposed perpendicular to the first horizontal guides to receive one of the bottom members for slidably guiding the same towards any one of two spaced pick-up positions for moulded tiles, third control means for urging the bottom members along said second horizontal guides under the central frame in the pressing position, means for partly and temporarily raising one movable frame located at the pressing position after pressing of a tile at the pressing position to permit withdrawal of a tile from an underlying bottom member, said third control means being actuated to move the bottom members during the raising of said one movable frame so as to bring a bottom member from a pick-up position to the pressing position and to bring another bottom member from the pressing position to the other pick-up position, said second control means being actuated after raising and subsequent lowering of a movable frame to move a bottom member and associated frame from the pressing position to one loading position and to move another bottom member and another associated frame from the other loading position to the pressing position.

References Cited in the file of this patent

UNITED STATES PATENTS

| | | |
|---|---|---|
| 1,005,706 | Hloch | Oct. 10, 1911 |
| 2,257,732 | Clark | Oct. 7, 1941 |
| 2,289,102 | Clark | July 7, 1942 |
| 2,317,440 | Cannon | Apr. 27, 1943 |
| 2,321,252 | Sayre | June 8, 1943 |

FOREIGN PATENTS

| | | |
|---|---|---|
| 545,939 | Italy | July 9, 1956 |